Dec. 16, 1930.  C. H. MASON  1,785,321
MANUAL TRAINING BENCH
Filed June 8, 1928   2 Sheets-Sheet 1
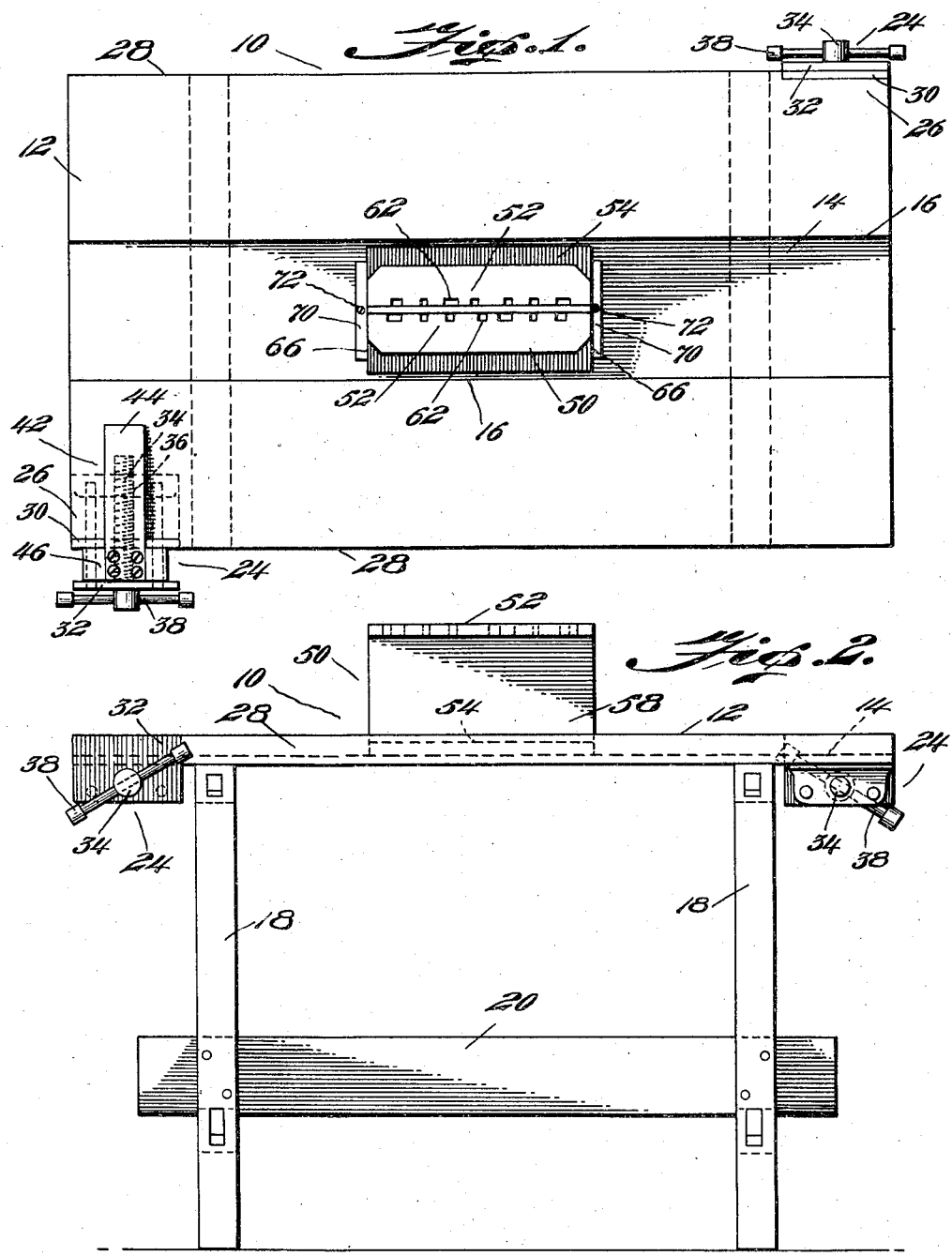
Inventor
Charles H. Mason
By Thomas A. Junkee Jr.
Attorney Dec. 16, 1930.   C. H. MASON   1,785,321
MANUAL TRAINING BENCH
Filed June 8, 1928   2 Sheets-Sheet 2
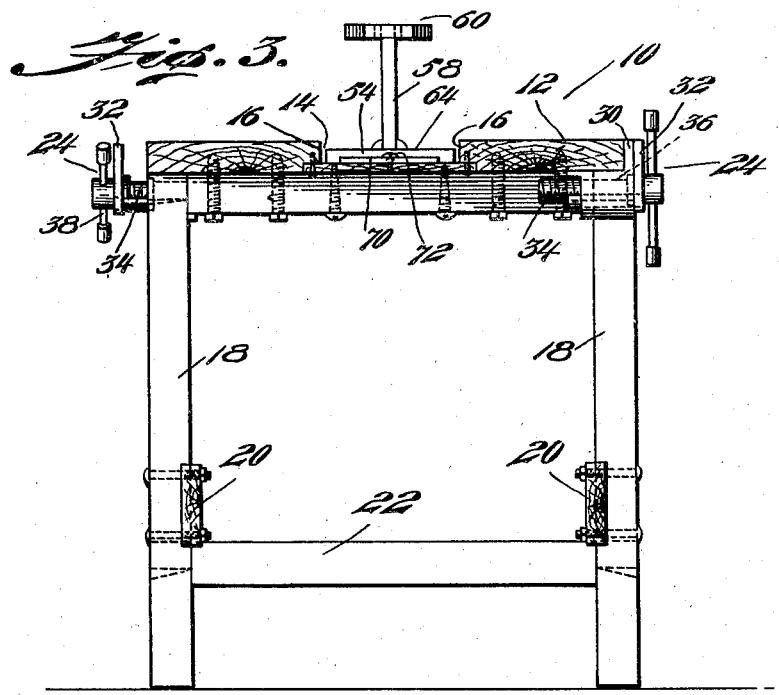
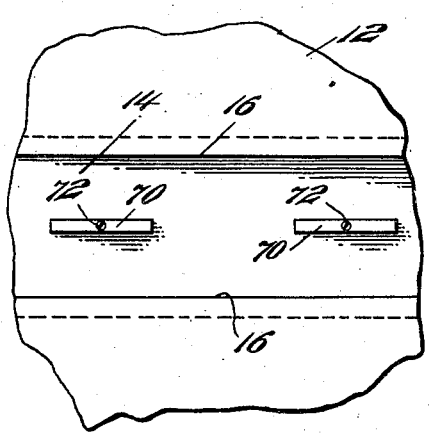
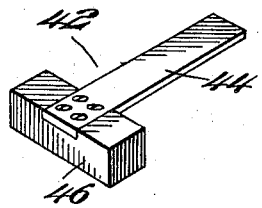

Patented Dec. 16, 1930

1,785,321

UNITED STATES PATENT OFFICE

CHARLES H. MASON, OF EAST PROVIDENCE, RHODE ISLAND

MANUAL-TRAINING BENCH

Application filed June 8, 1928. Serial No. 283,892.

My invention relates to benches for use in the manual training of students.

The manual training benches in use in the schools today are merely crude adaptations of old types of carpenter benches and apparently have never been redesigned for their specific use in the manual training of students. They normally have a high back, which obscures the light from the work and takes up much more room than is actually needed in the often limited school room.

An object of my invention is to provide a bench particularly adaptable for the use of manual training of students which is suited for their needs, strong and of a neat compact size with the desired amount of necessary space for each student.

A further object of my invention, in order to conserve room in the school room, is to provide a double manual training bench constructed so as to have plenty of room for a student to work on each side thereof. By thus combining the former benches into a double manual training bench it is possible to conserve a lot of room in the limited space available therefor in the crowded school room. I so construct my double manual training bench as to have all the parts necessary for the student within ready reach of each student on each side thereof.

A further object of my invention is to provide a detachable unitary tool stand normally located in the center of my improved manual training bench and readily reachable by each student and limited in size to only holding the requisite number of tools necessary for manual training purposes.

Present day benches often have many types of protuberances protruding from the upper top surface thereof and a further object of my invention is to provide a manual training bench to take up a minimum amount of room which may, if desired, have a flat upper surface. To this end I locate suitable vises for each student on obliquely opposite ends of each side thereof and I so construct the upper surface of the movable portions of each vise so that it will be substantially level with the bench top in order that the top of the bench may be available to work on substantially up to the center thereof. I mount the unitary work stand heretofore referred to in a longitudinally extending central groove in the table. In addition I preferably detachably mount the work stand so that it may be removed entirely in case a student desires to lay a board entirely across the bench. The unitary work stand is constructed of such light material and of such a minimum number of parts that it may be removed from this groove by a small child without difficulty.

I preferably construct the groove with flat side edges and the base of the work stand cooperates with the flat side edges of substantially the width of the groove to retain the tool stand base within the groove against transverse displacement. In order to secure the base of the work stand against longitudinal displacement, I pivotally mount arms spaced from each other substantially the length of the tool stand base on suitable means, such as screws located centrally of the central groove, which arms are pivotable to longitudinal alignment within the groove in case it may be desired to sweep out the groove of shavings and other detritus.

As stated, I so construct my improved bench top surface substantially flat in case it be desired to brace a board end for sawing, planing, or other purposes. On the upper surface of the bench, I provide a suitable brace for this purpose, which in my preferred embodiment comprises a T-brace having a flat T-stem adapted to overlie the bench top surface for abuttal of a board end thereon and a T-head of substantial depth preferably countersunk within the upper under surface of said T-stem adapted to be detachably clamped by the vise jaw surfaces. It is thus obvious that this board end brace cooperates with my bench to provide a suitable board end brace therefor.

These and such other objects of my invention as may hereinafter appear will be best understood from a description of the accompanying drawings, which illustrate an embodiment thereof.

In the drawings, Fig. 1 is a plan view of an improved manual training bench constructed in accordance with the teachings of my invention.

Fig. 2 is a side elevation thereof.

Fig. 3 is an end elevation thereof.

Fig. 4 is a detailed plan view showing the brace arms for securing the detachable tool stand base against longitudinal movement pivoted to longitudinal alignment for cleaning the central groove thereof.

Fig. 5 is a perspective view of the detachable board end brace I preferably employ in conjunction with my improved bench.

In the drawings, wherein like characters of reference indicate like parts throughout, 10 generally indicates a manual training bench constructed in accordance with the teachings of my invention.

As stated, for purposes of saving room in the too often crowded school room, I preferably construct my improved bench 10 so as to accommodate two students, one on each side thereof, although it is apparent that if desired the top of the bench may be extended to join a plurality of the unit benches shown in a row. My improved bench 10 includes the flat top 12 provided with the central longitudinally extending groove 14 having the preferably flat side edges 16. The top 12 of my improved bench is preferably supported by the legs 18 suitably braced by the longitudinal braces 20 and transverse braces 22.

I provide vises 24 for each student mounted on obliquely opposite ends 26 of each side edge 28 of the top 12 thereof. The side edge 28 of the top 12 adjacent the ends 26 thereof forms the stationary gripping jaw 30 of the vice 24. The vise 24 is provided with the usual movable jaw 32 moved as usual relative to the stationary jaw 30 by means of the usual threaded bolt 34 fitted into the usual threaded hole 36 in the stationary jaw 30 and movable on turning of the usual handle 38. The movable jaw 32 is so constructed so as to have the upper surface thereof substantially level with the top 12 of the bench so that when the vise 24 is not in use a board may extend flatly over the top thereof.

As stated, as the top surface is normally flat it is essential that I provide suitable means to brace a board end thereon. For this purpose, I supply the board end T-brace 42 shown in detail in Fig. 5 provided with the flat T-stem 44 adapted to overlie the bench top 12 for abuttal of a board end thereon and a T-head 46 of substantial depth secured to (preferably by countersinking it therein), the upper under surface of the T-stem 44 adapted to be detachably clamped by the vise jaws. It is thus obvious that when the head 46 is securely clamped by the vise jaws 30 and 32 as shown in Fig. 1 thus making the T-stem 44 extend transversely of the bench top 12, that a board end may be laid against the flat stem 44 to form a brace for the desired operations such as planing, etc., on the upper surface of the board.

I provide a tool holding stand 50 mounted centrally of the bench top 12 having a tool supporting means 52 for each student on each side thereof readily available for his use. In my preferred embodiment, I preferably construct the tool holding stand 50 so that it may be readily removable and in order that the space on the bench top may be available to approximately the center thereof, I preferably construct the tool stand 50 with the base 54 adapted to fit within the central longitudinal groove and having the preferably flat edges adapted to parallel the flat edges 16 of the groove to keep said base against transverse movement within the groove. The central support 58 projects upwardly centrally of said base and the top 60 mounted centrally on said support 58 is provided on each side thereof adjacent the support 58 with the separate sets of vertical holes 62 adapted to support tools for each student on opposite sides thereof, one set for each student. It is thus obvious that the upper surface 64 of the base 54 as shown in Fig. 3 normally lies within the groove 14 below the bench top 20 so as to make the space on each side of the stand 50 available entirely up to the center support 58 thereof. In addition, I provide means to detachably secure the tool stand 50 against longitudinal movement within said central groove 14. In my preferred embodiment said means comprises the arms 70 spaced from each other substantially the length of the tool stand base adapted to abut when in a transverse position the ends 66 of the tool stand base 54 pivotally mounted centrally of the groove 14 by means of the screws 72 and thus pivotable as shown in Fig. 4 into longitudinal alignment with each other within said groove 14, after removal of said stand 50 from said groove so that the groove 14 may be readily swept clean of shavings or other detritus without obstruction from the arms 70.

If desired any of the features explained in detail may be omitted and the tool stand 50 may if desired be detachably or otherwise secured, preferably centrally of the bench 10 in any suitable manner.

It is understood that my invention is not limited to the specific embodiment shown and that various deviations may be made therefrom without departing from the spirit and scope of the appended claims.

What I claim is:

1. A double manual training bench comprising a flat top having a central longitudinally extending flat edged groove therein, four longitudinally and transversely braced legs supporting said top, vises for each student mounted on obliquely opposite ends of each side thereof so as to have the upper surface of the movable gripping jaws thereof substantially level with the bench top, T-braces for board ends having T-stems adapted to overlie the bench top surface for abuttal of a board end thereon and T-heads of substantial depth secured to the upper under surface of the T-head adapted to be detachably clamped between the vise jaw surfaces, a common removable tool holding stand having a top having separate sets of vertical tool supporting holes therein on opposite sides thereof, one set for each student and a base of substantially the width of the flat edged groove adapted to rest in the central groove below the bench top, and means to detachably secure said tool stand base against longitudinal movement within said central groove comprising arms spaced from each other substantially the length of the tool stand base pivotably mounted centrally of said central groove pivotable to longitudinal alignment within said groove for cleaning purposes on removal of said stand from said groove.

2. A double manual training bench comprising a flat top having a central longitudinally extending flat edged groove therein, four legs supporting said top, vises for each student mounted on obliquely opposite ends of each side thereof so as to have the upper surface of the movable gripping jaw thereof substantially level with the bench top, a common removable tool holding stand having a top having separate sets of vertical tool supporting holes therein on opposite sides thereof, one set for each student and a base of substantially the width of the flat edge groove adapted to rest in the central groove below the bench top and means to detachably secure said tool stand base against longitudinal movement within said central groove comprising arms spaced from each other substantially the length of the tool stand base pivotably mounted centrally of said central groove pivotable to longitudinal alignment within said groove for cleaning purposes on removal of said stand from said groove.

3. A double manual training bench comprising a flat top having a central longitudinally extending flat edged groove therein, four legs supporting said top, a common removable tool holding stand having a top having separate sets of vertical tool supporting holes therein on opposite sides thereof, one set for each student and a base of substantially the width of the flat edged groove adapted to rest in the central groove below the bench top and means to detachably secure said tool stand base against longitudinal movement within said central groove comprising arms spaced from each other substantially the length of the tool stand base pivotably mounted centrally of said central groove pivotable to longitudinal alignment within said groove for cleaning purposes on removal of said stand from said groove.

4. A double manual training bench comprising a flat top having a central longitudinally extending flat edged groove therein, four legs supporting said top, a common removable tool holding stand having a top having separate sets of vertical tool supporting holes therein on opposite sides thereof, one set for each student and a base of substantially the width of the flat edged groove adapted to rest in the central groove below the bench top and means to detachably secure said tool stand base against longitudinal movement within said central groove.

5. A double manual training bench comprising a flat top having four legs supporting said top, vises for each student mounted on obliquely opposite ends of each side thereof so as to have the upper surface of the movable gripping jaw thereof substantially level with the bench top, T-braces for board ends having T-stems adapted to overlie the bench top surface for abuttal of a board end thereon and T heads of substantial depth secured to the upper under surface of the T heads adapted to be detachably clamped between the vise jaw surfaces, a common tool holding stand having a top having separate sets of vertical tool supporting holes therein on opposite sides thereof, one set for each student mounted centrally of the top thereof.

6. A double manual training bench comprising a flat top having a central longitudinally extending flat edged groove therein, four legs supporting said top, tool supporting means for each student on each side thereof and a base of substantially the width of the flat edged groove adapted to rest in the central groove below the bench top and means to detachably secure said tool stand base against longitudinal movement within said central groove comprising arms spaced from each other substantially the length of the tool stand base pivotably mounted centrally of said central groove pivotable to longitudinal alignment within said groove for cleaning purposes on removal of said stand from said groove.

In testimony whereof I affix my signature.

CHARLES H. MASON.